4 Sheets--Sheet 1.

J. N. SMITH.
Railway Axle-Box.

No. 6,487. Reissued June 15, 1875.

Witnesses:
J. R. Baker
A. Holman

Inventor:
J. Nottingham Smith
By H. James Weston
His Attorney.

4 Sheets--Sheet 2.

J. N. SMITH.

Railway Axle-Box.

No. 6,487.

Reissued June 15, 1875.

Witnesses:

J. R. Baker

A. Holman

Inventor:

J. Nottingham Smith

By H. James Weston

His Attorney

J. N. SMITH.

Railway Axle-Box.

No. 6,487. Reissued June 15, 1875.

Witnesses:

J. H. Baker

A. Holman

Inventor:

J. Nottingham Smith

By H. James Weston

His Attorney

J. N. SMITH.

Railway Axle-Box.

No. 6,487. Reissued June 15, 1875.

Witnesses:

W. Baker

A. Holman

Inventor:

J. Mottingham Smith

By H. James Weston

His Attorney

UNITED STATES PATENT OFFICE.

J. NOTTINGHAM SMITH, OF JERSEY CITY, NEW JERSEY.

IMPROVEMENT IN RAILWAY-AXLE BOXES.

Specification forming part of Letters Patent No. 161,069, dated March 23, 1875; reissue No. 6,487, dated June 15, 1875; application filed April 29, 1875.

*To all whom it may concern:*

Be it known that I, J. NOTTINGHAM SMITH, of Jersey City, in the county of Hudson and State of New Jersey, have invented a Railway-Axle Box and Oiler, of which the following is a specification:

The object of my invention is to relieve the bearings of a railway-car axle from the severe twisting-strains to which they are constantly liable while the car is in motion, and which, in the construction of the truck heretofore in general use, have caused the bearing to twist or swing around on the axle so as to be cramped at the ends or corners, and also (in the case of overloading of the car) have caused the whole load to be borne on one end of the bearing. The result of this abnormal or imperfect action has been that the load, which should have been distributed over from twenty-five to forty inches of surface, is concentrated on a small fraction of that amount, and both the bearing or brass and the journal have become rapidly heated and worn out.

A further object of my invention is to provide a simple, economical apparatus for continuously supplying oil to the running-surfaces, and also for keeping the oil and the running-surfaces clean, and free from grit and dirt.

My invention consists in the application to, or combination with, the housing of a ball-and-socket joint, a stopping-bar, and other devices, whereby the bearings, and all the other parts, while firmly held in their proper positions with relation to each other, are yet allowed the necessary freedom of motion to enable them to act to the best advantage in performing their various functions, and the continuous lubrication of the parts is effected in a very simple manner and with great economy of oil.

Figure 1:
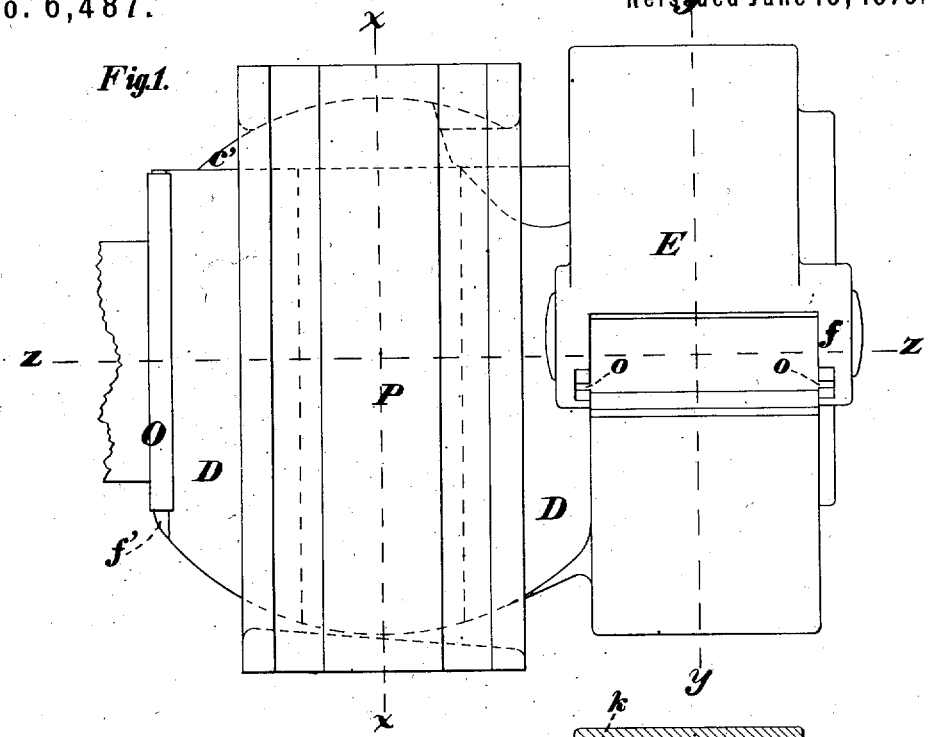
Figure 2:
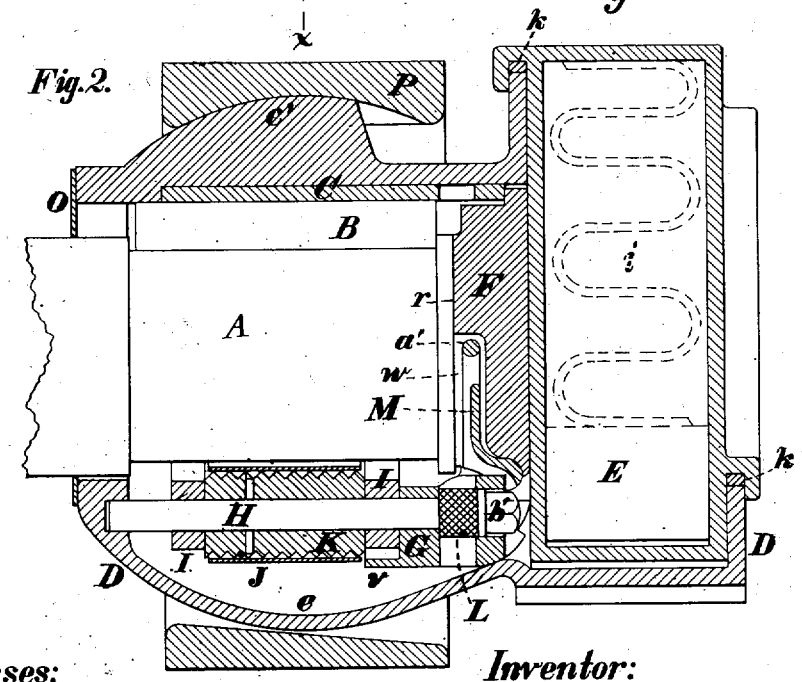
Figure 3:
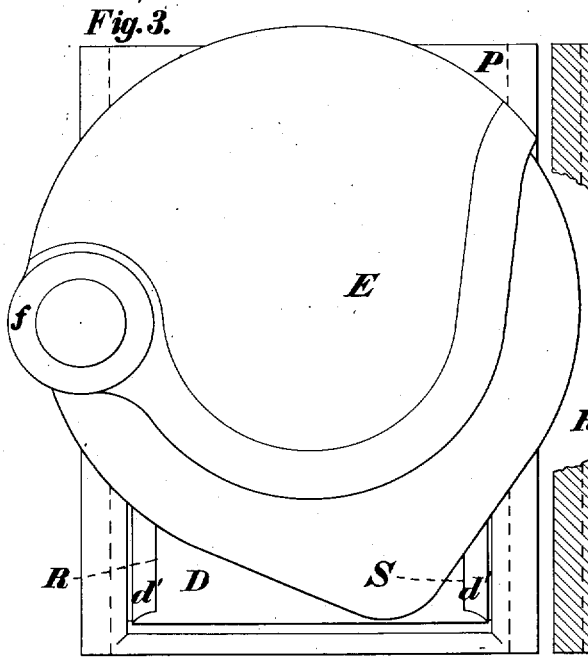
Figure 4:
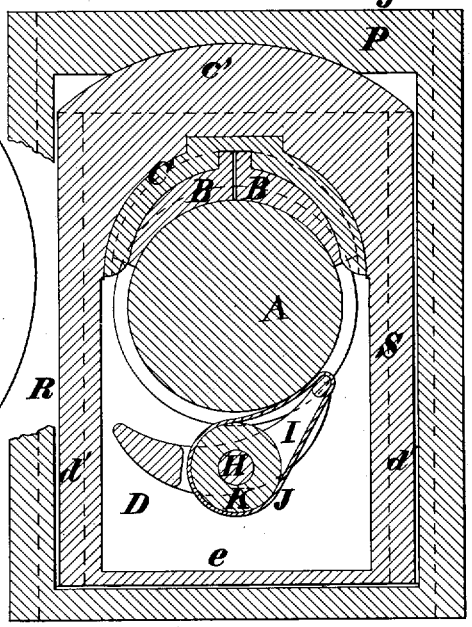
Figure 5:
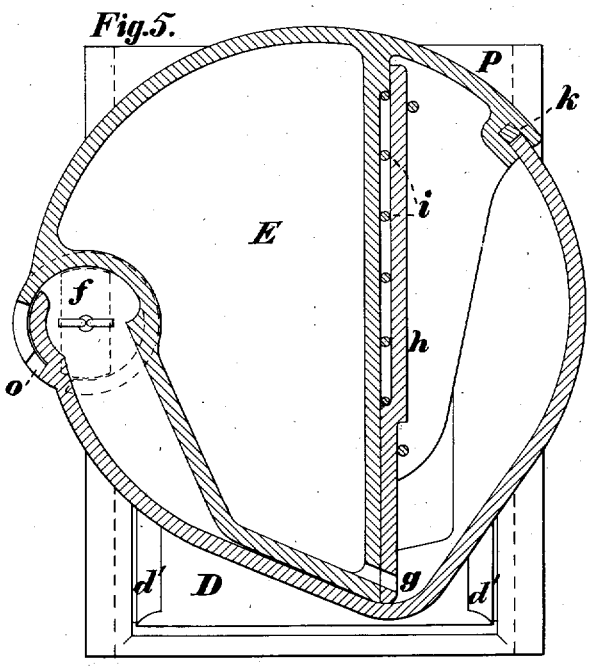
Figure 6:
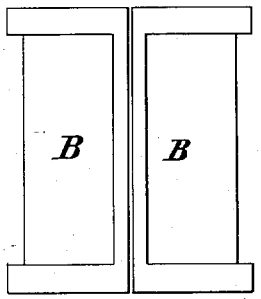
Figure 7:
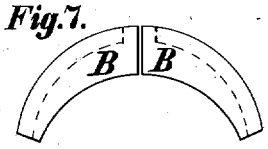
Figure 8:
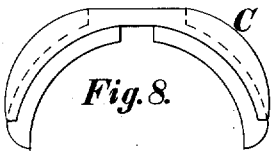
Figure 9:
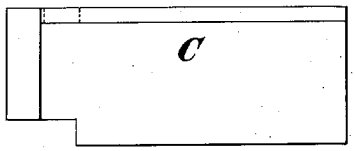
Figure 10:
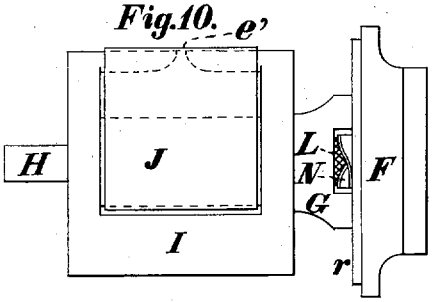
Figure 12:
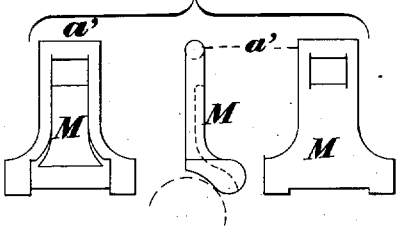
Figure 13:
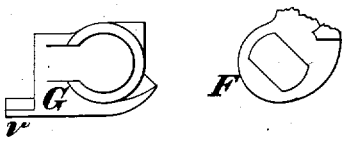
Figure 11:
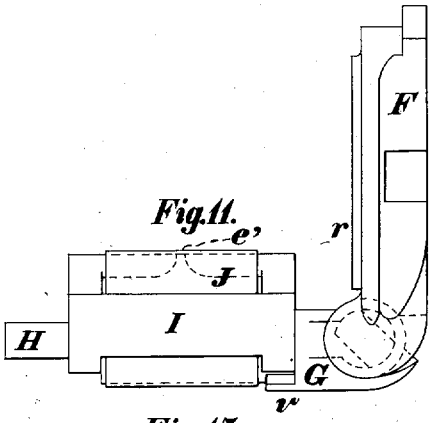
Figure 14:
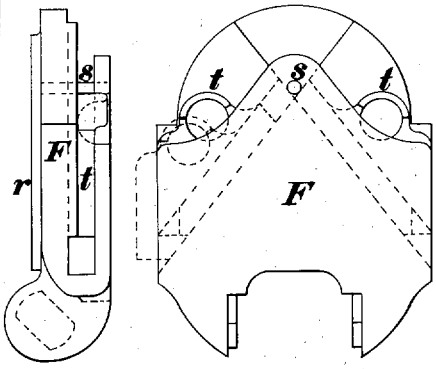
Figure 15:
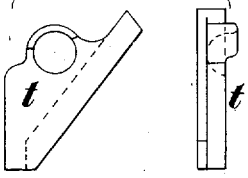
Figure 16:
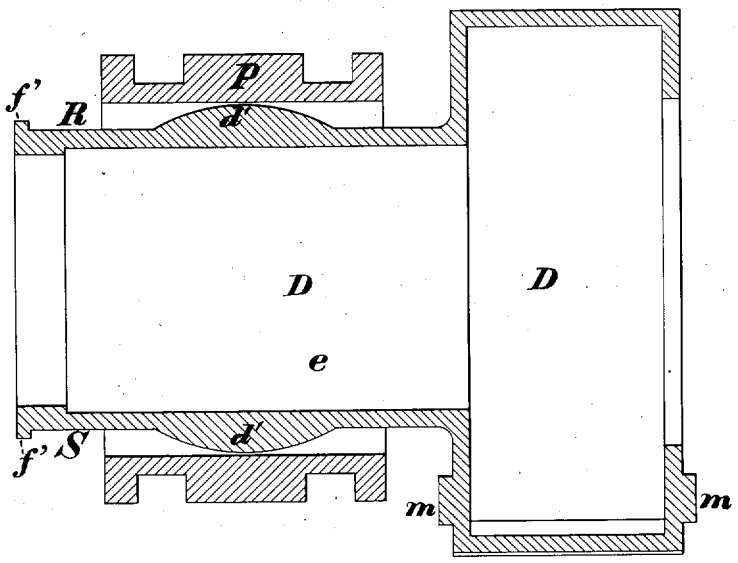
Figure 17:
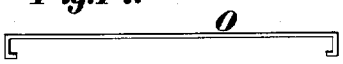

In the accompanying drawings, which illustrate a journal-box and oiler embodying my invention, Figure 1 is a side elevation; Fig. 2, a vertical longitudinal section through the center; Fig. 3, an end elevation, showing the outer end; Fig. 4, a section on the line *x x*, Fig. 1; Fig. 5, a section on the line *y y*, Fig. 1; Fig. 6, a top view of the bearings or linings; and Fig. 7, an end view of the same. Fig. 8 is an end view of the movable plate or seat, into which the lining, Figs. 6 and 7, is fitted. Fig. 9 is a side view of the same. Fig. 10 is a top view of the stopping-bar and devices for applying oil to the running-surfaces. Fig. 11 is a side view of the same. Fig. 12 shows a back, an edge, and a front, view of a small counterweight or tumbler, used in applying oil to the end of the axle, where it bears on the stopping-bar. Fig. 13 shows, in detail, the hinge-joint, by means of which the oiling devices are secured to the stopping-bar. Fig. 14 shows an edge and a side view of a modified form of stopping-bar, in which wedge-shaped bolts are used to support the stopping-bar against the thrust of the axle; and Fig. 15 shows a side and an edge view of one of the bolts used in Fig. 14. Fig. 16 is a horizontal section on the line *z z*, Fig. 1, showing the housing and the surrounding frame or slide; and Fig. 17 is a top view of the sliding cover, which closes the inner end of the housing against the admission of dust.

The housing D is an inclosed dust-proof chamber, containing the oiling devices, a supply of oil, the stopping-bar, and the bearings, which rest upon the journal of the car-axle, and support the weight of the car. At the top of the housing D a ball-shaped or spherical projection, *c'*, is formed, which fits into a seat made to receive it in the slide P, thus forming a ball-and-socket joint. This joint enables the bearing B to follow and accommodate itself to all the motions of the axle A except that of rotation on its axis. The slide P has vertical ribs or projections (with grooves or slots between) on its outer vertical surface, which are calculated to correspond with and fit into corresponding vertical ribs and grooves on the inner faces of the jaws of the pedestals or depending portions of the truck, and thus allow the slide to move freely up and down in the said jaws when the springs of the truck are compressed by the weight of the car.

The slide P is represented as surrounding the housing D, as I consider it more convenient to have it in that form; and the bottom of the housing is rounded at the corners, in order to permit it to enter the slide. A portion of the spherical part of the ball-joint is also cut away, for the same reason.

In order to keep the housing D from rotating (with the rotation of the axle) in the slide P, or in the female part of the ball-joint, I form one or more flat sides on it, as in the form shown, where there are two, R and S, it being necessary, of course, to leave a certain amount of open space between these flat sides and the adjacent parts, in order not to limit too much or cramp the action of the ball-joint too closely, and yet the space must be small enough to prevent the housing from leaving its proper or normal position.

To accomplish the limitation of the motion of the housing laterally, and at the same time to permit it to swing around freely on a vertical axis when necessary to prevent the cramping of the bearings, I provide two cylindrical swells, *d′ d′*, on the vertical sides of the housing, as shown. By giving this cylindrical form to the sides of the housing I am enabled to obtain great ease of action and at the same time to make the sides of the housing nearly or quite touch the sides of the slide P. The housing D being thus formed and made capable of always occupying the same position with relation to the axle, I insert in it the stopping-bar F, the bearing-face of which is thus always kept perfectly parallel with the flat end of the axle, and, therefore, can always take a fair bearing upon it, which has never been accomplished with any stopping-bar heretofore known. The stopping-bar F is a thick flat plate of metal, having a circular bearing-face, *a*, (which may be cast on a chill-plate if desired,) for the end of the axle to work against. A recess, *w*, is formed in the face of the stopping-bar, through which oil is introduced and applied to the bearing-surfaces for purposes of lubrication. It will be observed that the recess *w* extends above the center of the axle, thus giving the oil an opportunity to distribute itself from the center outward and utilizing the tendency it would necessarily have to fly out from the center when the car is in motion. Fitted into the recess formed by this opening is a counterweight or tumbler, *m*, which is so formed and seated in the recess that it has a constant tendency to fall inward against the end of the journal. Around a bar, *a′*, at the top of this counterweight, the endless wick *n* is passed, and with a quarter twist is carried down around the rough-faced roller or cylinder L, where it dips into the oil. This counterweight *m* holds the wick up against the end of the axle whenever it is in contact with the bearing-face *r*, and insures constant lubrication of the parts. When that portion of the wick which is in contact with the axle becomes worn or filled with gummy oil, the bolt H, which carries the roller L, is turned with a wrench applied to the square head *b′* and thus a fresh portion of the wick is brought to bear on the end of the axle. In the bottom of the housing a well, *e*, is formed for holding a supply of oil. The oil is conveyed from this well to the surface of the journal by the endless wick J, which passes around the lighter side of the counterweight I and also around the rough-faced roller *k*. One side of the counterweight I is made much heavier than the other, and the counterweight being hung loosely on the bolt H its heavier side forces up the lighter side and keeps the wick J always in contact with the journal. A slot, *e′*, in the lighter side of the counterweight I facilitates the removal and replacement of the wick J. When that portion of the web J, which is in contact with the journal, becomes worn or filled with gummy oil, a fresh portion is brought into contact with the journal by turning the rod or bolt H and with it the roller *k*. A stop, *v*, on the bearing-piece G prevents the counterweight I from swinging around too far when the oiling devices are being removed from the housing, or replaced in it. The devices for oiling the journal are all connected together, and also to the bearing-piece G, which is hinged to the stopping-bar, so as to allow sufficient movement to the parts in removing and replacing it. The oil-well *e* is automatically supplied with oil from a tank, E, which is hinged to the housing D and rests in, and closes, an opening or pocket in the outer end of the said housing. The tank E has but one opening, *g*, which serves both for filling it and for feeding out the oil to the well *e*. This opening is at the bottom of the tank, and is so placed that when a sufficient supply of oil is in the well *e* the oil covers the opening *g* and prevents the ingress of air and consequently the egress of the oil. When, however, the oil in the well *e* gets below the level of the opening *g* a small quantity of air enters the tank, which allows a corresponding amount of oil to escape and thus raise the level of the oil and prevent the further escape of the oil in the tank.

Attached to the tank is a valve, *h*, operated by a spring, *i*, which closes the opening *g*, when the tank is swung upon the hinge for filling, and keeps it closed when the tank is lowered again, until the end of the valve strikes against the bottom of the pocket in the housing, and is forced up, thus opening the outlet.

The tank E is attached to the housing P by means of the hinge-joint *f*, clearly shown in Figs. 3 and 5. A part of the barrel of the hinge is formed on the tank and a part on the housing, the pivot being formed by the two projections *m m* on the housing, which enter the annular seats in the tank through the slots *o*.

It will be seen that the parts so fit together as to make a dust-proof joint, while the construction is exceedingly cheap and simple.

The edge of the tank has a groove formed in it where it comes in contact with the edge of the pocket in the housing, and in this groove a packing, *k*, of india-rubber, leather, or other suitable material is placed, which makes that part of the junction between the tank and the housing dust proof.

If in any case the support given to the stopping-bar by the tank E should be deemed insufficient, I have provided additional support in the wedge-shaped bolts *t t*, which slide in seats in the stopping-bar, and are forced into recesses in the sides of the housing when the stopping-bar is in place. The bolts *t* are prevented from being lost out when the stopping-bar is taken out of the housing by the pin *s*.

To prevent the dust and dirt from entering the inner end of the housing around the axle, the slide or cover O is fitted to that end of the housing. This slide has a hole in it, through which the axle passes, and its vertical edges are bent around, as seen in Fig. 17, so as to clasp the ribs *f' f'* formed on the housing, and thus make a dust-proof joint.

It is evident that as the bearings B wear away, the cover O will move freely up with the axle, and keep the housing at that end tightly closed; and, further, that if the housing were not connected to the truck by a ball-and-socket joint, so as to follow every motion of the axle, except that of rotation, it would not be possible to make the cover O fit so closely around the axle as to exclude the dust.

The bearing-plate B B, (shown in two parts, as that is considered the most desirable form in which to make it, for the open space thus left between the parts, by breaking the continuity of the bearing-surface, materially aids in preventing the accumulation of heat in the bearing,) has its upper side fitted into a removable seat, C, which in turn finds its seat or bearing in the housing D, the bearing B being held in place, even if broken or worn very thin, by ribs or projections, which fit into cavities in the seat C, as seen in Figs. 6 and 7. The seat C is also held in place by projections on its upper surface, which fit into recesses in the housing. By the use of the seat C the fitting of new and replacing of worn out bearings is greatly facilitated.

I am aware that a jointed railroad-car truck has been patented, in which one of the axles is described as arranged in swiveling or ball-jointed boxes; but that was done in order to allow the truck-frame itself to be distorted horizontally from its normal rectangular form in passing curves. The application of the ball-joint as there described I do not claim.

Having thus fully described my invention, I claim—

1. In a railroad-car truck, in combination with the ball-jointed housing D, the slide P, substantially as and for the purpose set forth.

2. In a railroad-car truck, the ball-jointed housing D, having flat sides, to prevent its turning around in its seat, substantially as and for the purpose set forth.

3. In a railroad-car truck, the housing D, having vertical cylindrical swells *d' d'* on its sides, to premit it to turn or swivel in its seat on a vertical axis, while it is prevented from turning on a horizontal axis by the said vertical sides, substantially as and for the purpose set forth.

4. In a railroad-car truck, in combination with the ball-jointed housing D and journal A, the stopping-bar F, substantially as and for the purpose set forth.

5. In a railroad-car truck, in combination with the housing and axle, a stopping-bar, having an opening extending across the center of the axle, substantially as and for the purpose set forth.

6. In a railroad-car truck, in combination with the stopping-bar F, having a recess in its bearing-face, through which to supply oil to the bearing and oiling-wick *n*, the counterweight or tumbler *m*, substantially as and for the purpose set forth.

7. The combination with the stopping-bar, having a recess in its bearing-face extending beyond the center of the axle, of the web *n*, tumbler *m*, roller L, and bolt H, substantially as and for the purpose set forth.

8. The combination of the bolt H, roller K, tumbler I, web J, and oil-well *e*, for oiling the journal, substantially as and for the purpose set forth.

9. In a railroad-car truck, in combination with the housing D, the oil-tank E, in which the oil is held by atmospheric pressure, and fed out automatically, so as to maintain the oil in the oil-well *e* at a given height, substantially as and for the purpose set forth.

10. In combination with the oil-tank E and housing D, the valve *h* and spring *i*, substantially as and for the purpose set forth.

11. The combination, with the oil-tank E and housing D, of the packing *k*, and hinge *f*, for excluding dust from the housing, substantially as set forth.

12. The combination of the stops *t*, with the housing D and stopping-bar F, substantially as and for the purpose set forth.

13. In combination with the ball-jointed housing D and axle A, the sliding cover O, for excluding dust, &c., substantially as set forth.

J. NOTTINGHAM SMITH.

Witnesses:

J. R. BAKER,

A. HOLMAN.